United States Patent
Banker et al.

(10) Patent No.: US 11,168,657 B2
(45) Date of Patent: Nov. 9, 2021

(54) METHODS AND SYSTEM FOR A STOP/START VEHICLE

(71) Applicant: Ford Global Technologies, LLC, Dearborn, MI (US)

(72) Inventors: Adam Nathan Banker, Canton, MI (US); Alexander Gibson, Ann Arbor, MI (US); David Andrew Ord, Woodhaven, MI (US); Imtiaz Ali, Lathrup Village, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/804,592

(22) Filed: Feb. 28, 2020

(65) Prior Publication Data

US 2021/0270223 A1 Sep. 2, 2021

(51) Int. Cl.
*F02N 11/08* (2006.01)
*F02D 41/38* (2006.01)
*F16H 1/06* (2006.01)

(52) U.S. Cl.
CPC .......... *F02N 11/0818* (2013.01); *F02D 41/38* (2013.01); *F02N 11/087* (2013.01); *F02N 11/0851* (2013.01); *F02N 11/0862* (2013.01); *F16H 1/06* (2013.01)

(58) Field of Classification Search
CPC .............. F02N 11/0818; F02N 11/087; F02N 11/0851; F02N 11/0862; F02D 41/38
See application file for complete search history.

(56) References Cited

U.S. PATENT DOCUMENTS

| | | | |
|---|---|---|---|
| 7,134,414 B2* | 11/2006 | Ries-Mueller | F02N 99/006 123/179.3 |
| 8,346,461 B2* | 1/2013 | Moessner | F02N 11/0848 701/113 |
| 8,370,051 B2 | 2/2013 | Pursifull et al. | |
| 10,859,055 B1* | 12/2020 | Doering | F02M 57/04 |
| 10,895,237 B1* | 1/2021 | Samie | F02N 11/0855 |
| 10,920,732 B1* | 2/2021 | Ord | F02N 11/0818 |
| 2004/0055553 A1* | 3/2004 | Asaka | F02N 11/08 123/179.3 |
| 2004/0200448 A1* | 10/2004 | Kojima | F02N 99/006 123/179.3 |
| 2005/0087169 A1* | 4/2005 | Yoshida | F02N 19/004 123/299 |
| 2007/0107416 A1* | 5/2007 | Udono | F02D 41/065 60/284 |

(Continued)

OTHER PUBLICATIONS

Doering, J. et al., "Methods and System for Starting an Internal Combustion Engine," U.S. Appl. No. 16/829,291, filed Mar. 25, 2020, 48 pages.

*Primary Examiner* — Carl C Staubach
(74) *Attorney, Agent, or Firm* — Geoffrey Brumbaugh; McCoy Russell LLP

(57) ABSTRACT

A method for operating a vehicle that may be automatically stopped and started is described. In one example, the method includes supply electrical current to a starter motor independently from supplying electrical current to a starter solenoid. In addition, the method includes adjusting and amount of electrical current that is delivered to the starter motor in response to a level of urgency of an automatic engine start.

9 Claims, 5 Drawing Sheets

(56) References Cited

U.S. PATENT DOCUMENTS

| | | | |
|---|---|---|---|
| 2008/0077308 A1 | 3/2008 | Laubender | |
| 2010/0300781 A1* | 12/2010 | Leone | B60L 53/14 |
| | | | 180/65.29 |
| 2012/0256523 A1* | 10/2012 | Fulton | F02N 11/02 |
| | | | 310/68 D |
| 2016/0298559 A1* | 10/2016 | Matsushita | F02N 11/0862 |
| 2018/0045162 A1* | 2/2018 | Enomoto | F02N 11/0818 |
| 2019/0040831 A1* | 2/2019 | Yamamoto | F02N 11/087 |

* cited by examiner

METHODS AND SYSTEM FOR A STOP/START VEHICLE

FIELD

The present description relates to methods and a system for starting an internal combustion engine that may be stopped and started frequently. The methods and systems may be applied to a stop/start vehicle in which the vehicle's engine may be automatically stopped and started.

BACKGROUND AND SUMMARY

A vehicle may include an internal combustion engine and a starter motor for the internal combustion engine. The starter motor may be engaged when commanded to do so by a human operator. The starter motor may also be engaged after the engine has been automatically stopped. The engine may be automatically stopped when driver demand torque is low to conserve fuel. The starter motor may be activated in response to an increasing driver demand torque, in response to a battery state of charge, or in response to other vehicle operating conditions. Automatic engine stopping and starting may accelerate degradation of the starter motor and associated engine starter components due to a higher frequency of use as compared to vehicles in which the starter motor is activated only in response from a human operator to start the vehicle's engine. Starter motors that are applied in stop/start vehicles may be designed for a higher use cycle; however, it may still be difficult for a starter motor of a stop/start vehicle to last for a life time of a vehicle. Therefore, it may be desirable to extend a life cycle of a starter motor of a stop/start vehicle.

The inventors herein have recognized the above-mentioned issues and have developed a method for starting an engine, comprising: adjusting a position of a starter solenoid to engage a pinion gear to a flywheel of an engine in response to a request to start the engine; initiating expansion combustion in the engine while the engine is not rotating in response to the request to start the engine; and supplying electrical current to a starter motor after initiating expansion combustion in the engine while the pinion gear is engaged with the flywheel.

By initiating expansion combustion in a cylinder, it may be possible to provide the technical result of increasing a life span of a starter motor. Specifically, the expansion combustion may reduce an amount of torque to start an engine so that the starter motor may operate at a lower load during engine starting. Operating the starter motor at a lower load during engine starting may extend a life span of the starter motor. In addition, quick engine starting may still be permitted when starting the engine via expansion combustion is too slow to meet vehicle requirements.

The present description may provide several advantages. Specifically, the approach may help to extend a life span of a starter motor. In addition, the approach may reduce an amount of electrical energy that is consumed during engine starting. Further, the approach may determine an urgency of an engine start request so that the life span of the starter motor may be increased. The level of urgency may also be a basis for determining which engine starting strategy is selected and activated so that vehicle drivability may be maintained within expected limits.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
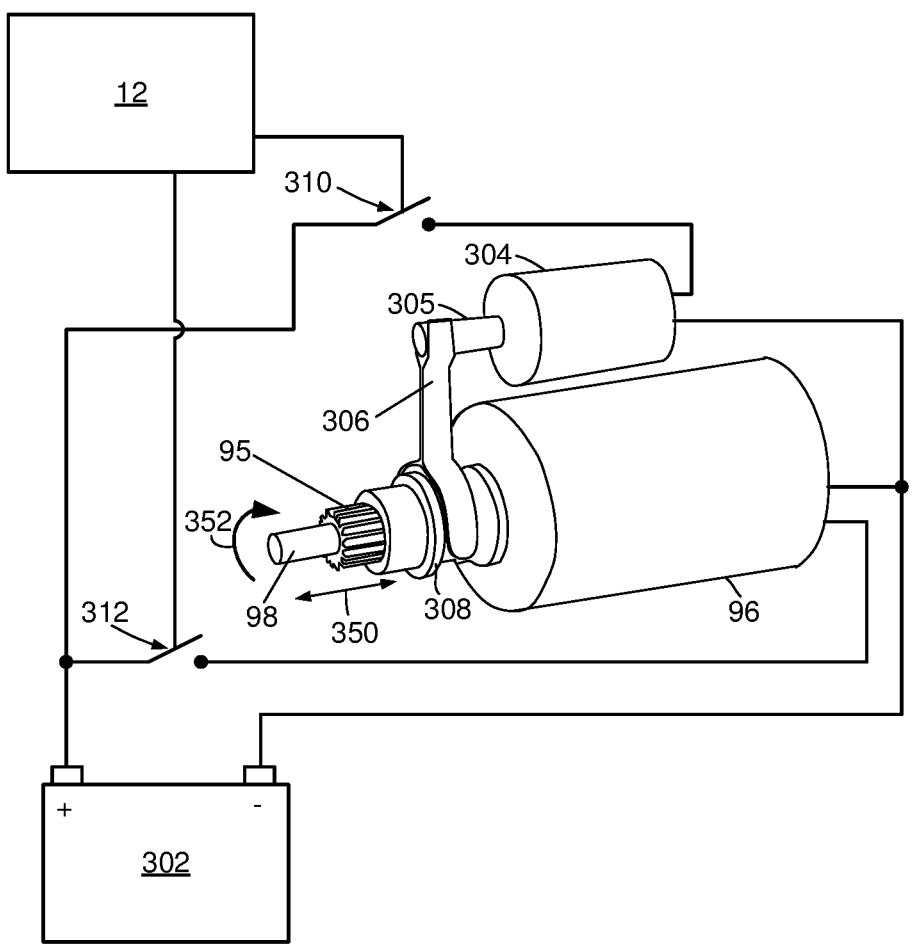
FIG. 3 shows an example electrical system for starting an engine.
Figure 4:
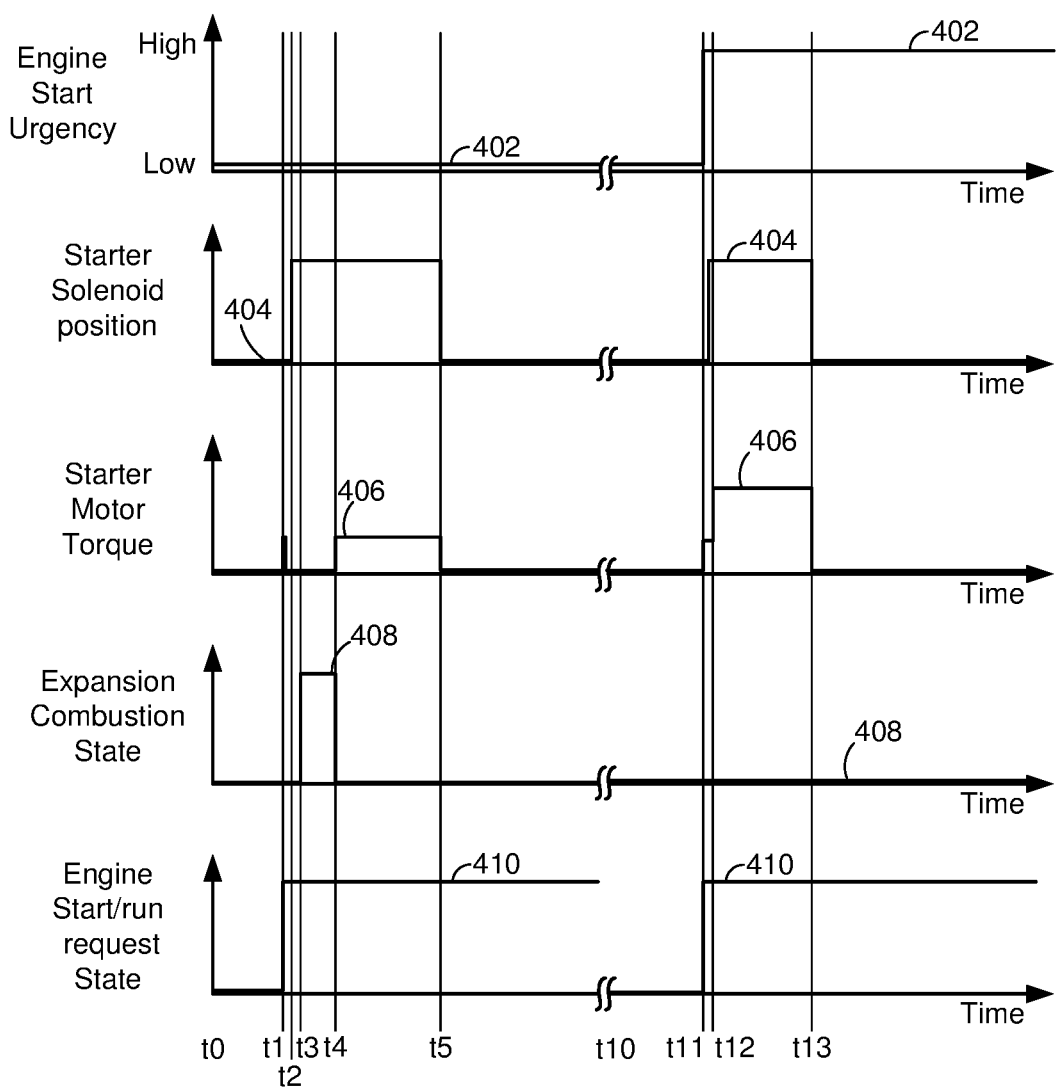
FIG. 4 shows an example vehicle operating sequence according to the methods of FIG. 5.

The present description is related to starting an internal combustion engine via an electric machine. The engine may be automatically started according to an urgency level for the engine start that is determined from vehicle operating conditions. For low urgency engine starts, the engine may be started such that the electrical energy to start the engine may be reduced as compared to engine starts that are determined to be of high urgency. For high urgency engine starts, maximum torque capacity of the electric machine may be requested so that the engine starts sooner. The engine and driveline may be of the type shown in FIGS. 1 and 2. The vehicle may include an electrical system as shown in FIG. 3. The driveline may be operated according to the methods of FIG. 5 as shown in the sequence of FIG. 4 to start and operate an engine.

Figure 1:
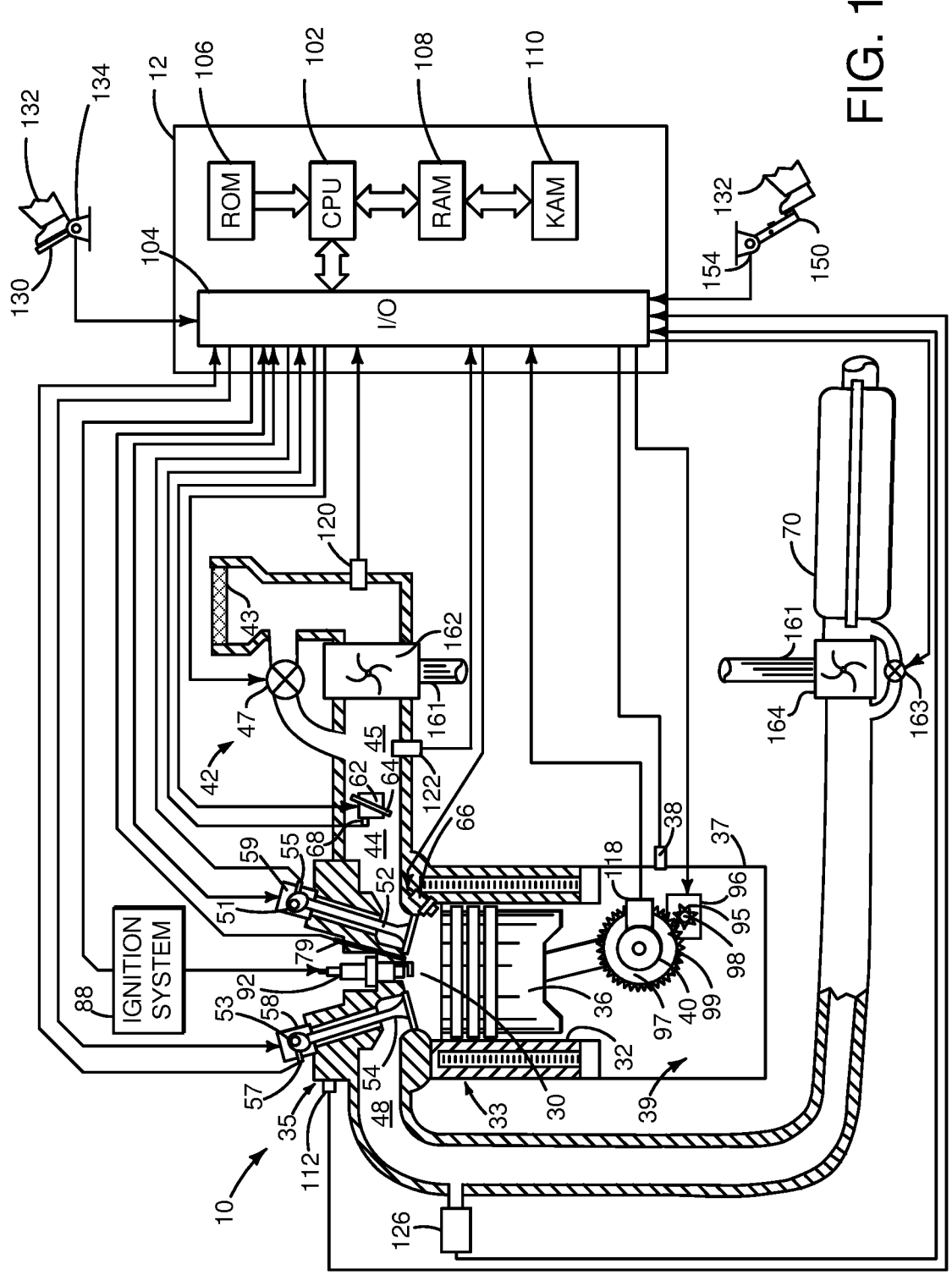
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter motor 96 (e.g., low voltage (operated with less than 20 volts) electric machine) includes pinion shaft 98 and pinion gear 95. Pinion gear 95 may selectively advance toward and retract from flywheel 97 via sliding in a longitudinal direction of pinion shaft 98 to engage and disengage ring gear 99 of flywheel 97. Starter motor 96 may be directly mounted to the front of the engine or the rear of the engine. In some examples, starter motor 96 may selectively supply torque to crankshaft 40 via a belt or chain. In one example, starter motor 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices. Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
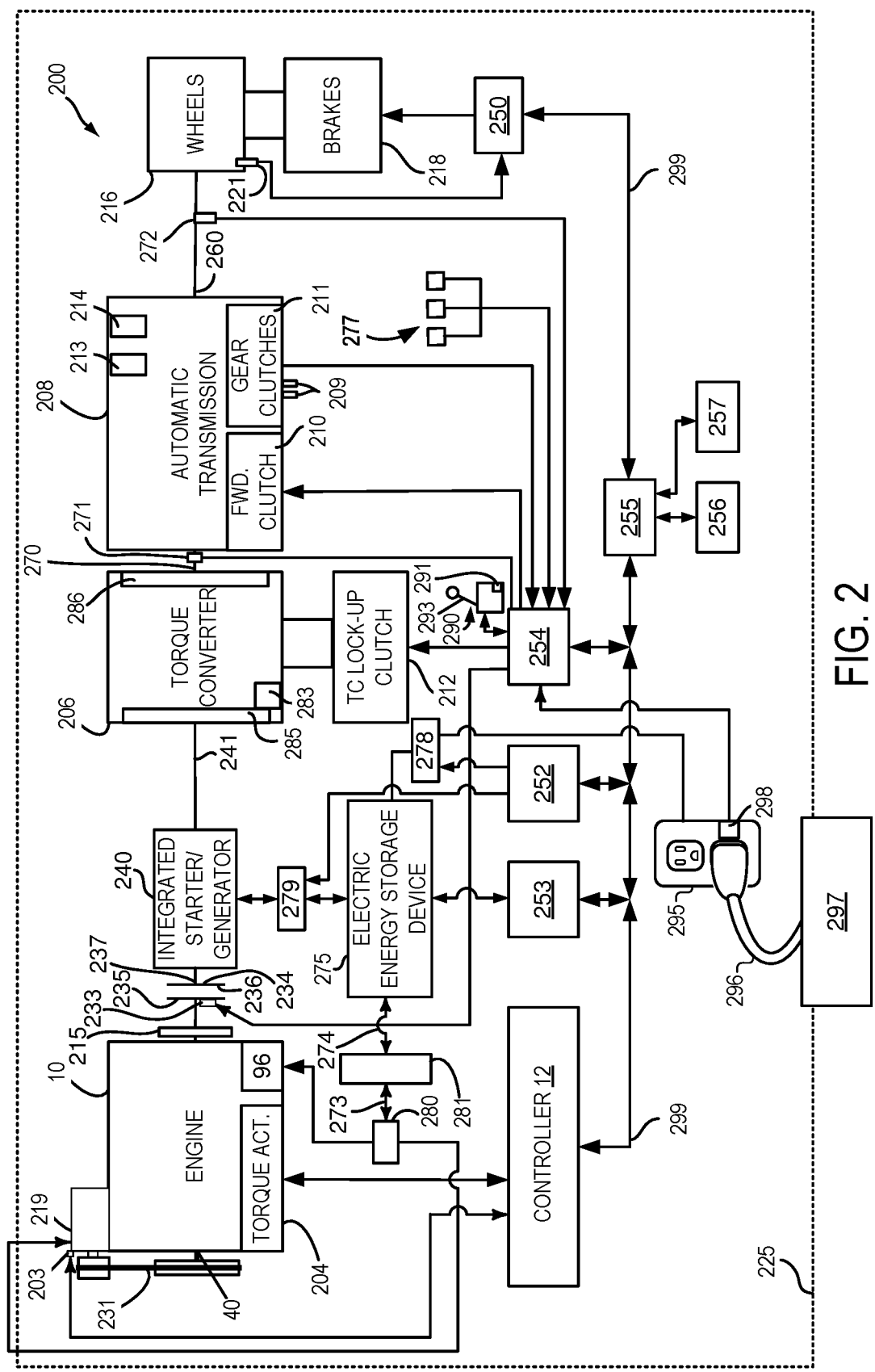
FIG. 2 shows a schematic diagram of an example vehicle driveline or powertrain including the internal combustion engine shown in FIG. 1.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, an electrical system that includes a starter motor 96 is shown. Starter motor 96 is electrically coupled to battery 302 via a first switch 312. In one example, first switch 312 may be a field effect transistor that may be adjusted via controller 12 to provide a plurality of different electrical current flow amounts between battery 302 and starter motor 96. Controller 12 may provide an adjustable voltage output to generate the plurality of electrical current flow amounts between battery 302 and starter motor 96. Alternatively, first switch may be comprised of a bi-polar transistor, relay, metal oxide semiconductor field effect transistor, or other known type of switch. Starter solenoid 304 is also electrically coupled to battery 302 via a second switch 310. Second switch 310 may be a field effect transistor, metal oxide semiconductor field effect transistor, bi-polar transistor, relay, or other known type of transistor. Controller 12 may provide an output to activate or deactivate starter second switch 310 to selectively activate and deactivate starter solenoid 304. Starter solenoid shaft or plunger 305 may move in a longitudinal direction to move lever 306. Lever 306 may adjust a position of collar 308 to advance or retract pinion gear 95 in the longitudinal direction 350 of starter motor 96 to engage and disengage with flywheel 97. Pinion gear 95 may be slid as indicated by arrow 350 along pinion shaft 98. Pinion gear 95 may rotate via starter motor 96 as indicated by arrow 352.

The first switch 312 allows the starter motor 96 to be activated and deactivated independently of activating and deactivating starter solenoid 304. Similarly, second switch 310 allows the starter solenoid to be activated and deactivated independently from activating and deactivating starter motor 96.

The system of FIGS. 1-3 provide for a vehicle system, comprising: an internal combustion engine including a flywheel; a starter motor including a pinion gear; a starter solenoid mechanically coupled to the starter motor; a battery; a first switch configured to selectively supply electrical current from the battery to the starter motor without supplying electrical current to the starter solenoid; a second switch configured to selectively supply electrical current from the battery to the starter solenoid without supplying electrical current to the starter motor; a controller including executable instructions stored in non-transitory memory that cause the controller to adjust the first switch to supply a first electrical current to the starter motor during a low urgency automatic engine start, and that cause the controller to adjust a the first switch to supply a second electrical current supplied to the starter motor during a high urgency automatic engine start. The vehicle system further comprises additional executable instructions that cause the controller engage the pinion gear to the flywheel before supplying the first electrical current or the second electrical current to the starter motor in response to an engine start request. The vehicle system includes where the first switch is a field effect transistor. The vehicle system further comprises additional instructions that cause the controller to initiate expansion combustion in the internal combustion engine during the low urgency automatic engine start. The vehicle system further comprises additional instructions that cause the controller to not initiate expansion combustion in the internal combustion engine during the high urgency automatic engine start. The vehicle system includes where initiating expansion combustion includes injecting fuel to a cylinder on an expansion stroke when the internal combustion engine is not rotating.

Referring now to FIG. 4, plots of two example engine starting sequences are shown. The engine starting sequences that are shown in FIG. 4 may be provided via the system of FIGS. 1-3 in cooperation with the methods of FIG. 5. The vertical lines at times t0-t13 represent times of interest during the engine starting sequences. The five plots shown in FIG. 4 are aligned in time. The double SS marks along the horizontal axis of each plot represent a break in time and the duration of the break in time may be long or short.

The first plot from the top of FIG. 4 is a plot of engine starting urgency state versus time. The vertical axis represents the engine starting urgency state and the engine starting urgency may be low or high. Trace 402 represents the engine starting urgency. The horizontal axis represents time and time increases from the left side of the plot to the right side of the plot.

The second plot from the top of FIG. 4 is a plot of starter solenoid position versus time. The vertical axis represents starter solenoid position and the starter solenoid position advances so that the pinion gear may engage the flywheel in the direction of the vertical axis arrow. Trace 404 represents the starter solenoid position. The horizontal axis represents time and time increases from the left side of the plot to the right side of the plot. The horizontal axis represents time and time increases from the left side of the plot to the right side of the plot.

The third plot from the top of FIG. 4 is a plot of starter motor torque versus time. The vertical axis represents starter motor torque and the starter motor torque increases in the direction of the vertical axis arrow. Line 406 represents the starter motor torque that is provided via the pinion gear. The horizontal axis represents time and time increases from the left side of the plot to the right side of the plot.

The fourth plot from the top of FIG. 4 is a plot of expansion combustion state versus time. The vertical axis represents the expansion combustion state. Expansion combustion is active when trace 408 is at a higher level near the vertical axis arrow. Expansion combustion is not active when trace 408 is at a lower level near the horizontal axis. Trace 408 represents the expansion combustion state. The horizontal axis represents time and time increases from the left side of the plot to the right side of the plot.

The fifth plot from the top of FIG. 4 is a plot of an engine start/run request state versus time. The vertical axis represents the engine start/run request state. An engine start request is present, or the engine is running (e.g., rotating and combusting fuel), when trace 410 is at a higher level near the vertical axis arrow. An engine start request is not present and the engine is stopped and not rotating when trace 410 is at a lower level near the horizontal axis. Trace 410 represents the engine start/run request state. The horizontal axis represents time and time increases from the left side of the plot to the right side of the plot.

At time t0, the engine is stopped (not shown) and an engine start/run is not requested. The engine start urgency level is shown as low, but it is of no consequence since an engine start is not being requested. The starter solenoid is not advanced and so the pinion gear (not shown) is not engaging the flywheel and ring gear. The starter motor torque is zero and expansion combustion is not activated.

At time t1, an engine start is requested. The engine start is a system induced engine start request (not shown) and a low engine start urgency determined to be present. The lower engine start urgency is based on the constant lower level driver demand torque (not shown) and the engine start being originated by the vehicle system (e.g., an engine start may be requested in response to a low state of battery charge). A small amount of torque is optionally provided by the starter motor to rotate the pinion gear, which may improve engagement between the pinion and the flywheel ring gear. The small amount of torque is reduced to zero shortly thereafter and before the starter solenoid is in a position to engage the pinion gear to the flywheel and ring gear. This may allow the starter motor to stop rotating while reducing starter noise and vibration. Expansion combustion is not activated and the engine is not rotating (not shown).

At time t2, the starter solenoid is advanced to engage the pinion gear to the flywheel and ring gear. The engine start urgency remains low and starter motor torque is zero. Expansion torque is not generated in the engine and the engine is not rotating (not shown). The engine start/run request remains asserted.

At time t3, the starter solenoid is fully advanced so that the pinion gear fully engages the flywheel and ring gear (not shown). Expansion combustion is initiated in the engine. Expansion combustion is initiated by directly injecting fuel to a cylinder that is on its expansion stroke. Further, the fuel is combusted via supplying a spark to the fuel that has mixed with air in the cylinder. The fuel injection and spark take place while the engine is not rotating. Combusting the fuel in the cylinder while the cylinder is on its expansion stroke may generate pressure in the cylinder, thereby generating torque to rotate the engine crankshaft and reduce engine cranking torque. Expansion combustion may be initiated in one or more engine cylinders while the engine is not rotating depending on the engine configuration. The engine start urgency remains low and starter motor torque is zero. Starter torque is zero at this time because electrical current is not flowing to the starter motor. By holding the starter motor electrical current at zero, the starter motor temperature may be maintained at a lower level and electrical energy is not consumed to begin engine rotation. The engine start/run request remains asserted.

At time t4, the engine begins to rotate (not shown) and the expansion combustion is deactivated. The starter motor torque is increased to a lower level, which may reduce starter motor degradation, while the engine is accelerated toward idle speed (not shown). The starter motor torque helps to continue engine rotation while normal combustion (e.g., combustion occurring while the engine is rotating and combusting air and fuel) is enabled (not shown) allowing the engine to accelerate to engine idle speed. The engine start/run request remains asserted and the engine start urgency remains low.

At time t5, engine speed (not shown) exceeds a threshold speed so starter motor torque is reduced to zero. The engine accelerates (not shown) under its own power. The engine start urgency level remains low and the starter solenoid is withdrawn to decouple the pinion gear from the flywheel and ring gear (not shown). Expansion combustion is not activated and the engine start/run request remains asserted. A break in the sequence is shown at time t10. The duration of the break may be long or short.

At time t10, the engine is stopped (not shown) and the engine start urgency level is low. The starter solenoid is not advanced so the pinion gear is not engaging the flywheel and ring gear (not shown). The starter motor torque is zero and expansion combustion is not activated. The engine start/run request is not asserted.

At time t11, an engine start request is asserted (not shown) in response to driver demand torque exceeding a threshold (not shown). The engine start urgency is estimated to be a high level based on the engine start being requested in response to the driver demand a exceeding threshold driver demand. The starter motor torque is increased to a lower level to rotate the pinion gear for engaging the flywheel. However, in other examples, the starter motor torque may be adjusted to a high level. Expansion combustion is not initiated because it may take time for combustion to begin and since it may cause a delay in pinion gear engagement, which may increase engine starting time. The starter solenoid is not advanced at time t11, but it is advanced shortly thereafter to engage the pinion gear to the flywheel ring gear (not shown).

At time T12, the starter solenoid is fully extended and the starter torque is increased to a high level to rotate the engine. Expansion combustion is not activated and the engine start/run request remains asserted. In another example, the starter torque may be increased to the high level at time t11 when the engine start/run request is asserted. Further, the starter solenoid may be activated to engage the pinion gear to the flywheel at time t11 depending the system configuration.

Between time t12 and time t13, normal combustion is initiated in the engine and the engine begins to accelerate under its own power. The starter motor continues to supply torque to the engine so that the engine may accelerate to engine idle speed. The engine start urgency level remains high and the starter solenoid remains activated to engage the pinion gear to the flywheel (not shown). The engine start/run request remains asserted.

At time t13, engine speed exceeds a threshold speed so the starter solenoid is deactivated to disengage the pinion gear from the flywheel ring gear (not shown). In addition, the starter motor torque is reduced to zero since the engine is rotating under its own power. Expansion combustion is not occurring in the engine.

In this way, starter motor torque may be reduced to a first lower level during low urgency engine starts to reduce a possibility of starter motor degradation. However, during higher urgency engine starts, the starter motor output may be a second higher level so as to rotate the engine at a faster speed to reduce engine starting time.

Figure 5:
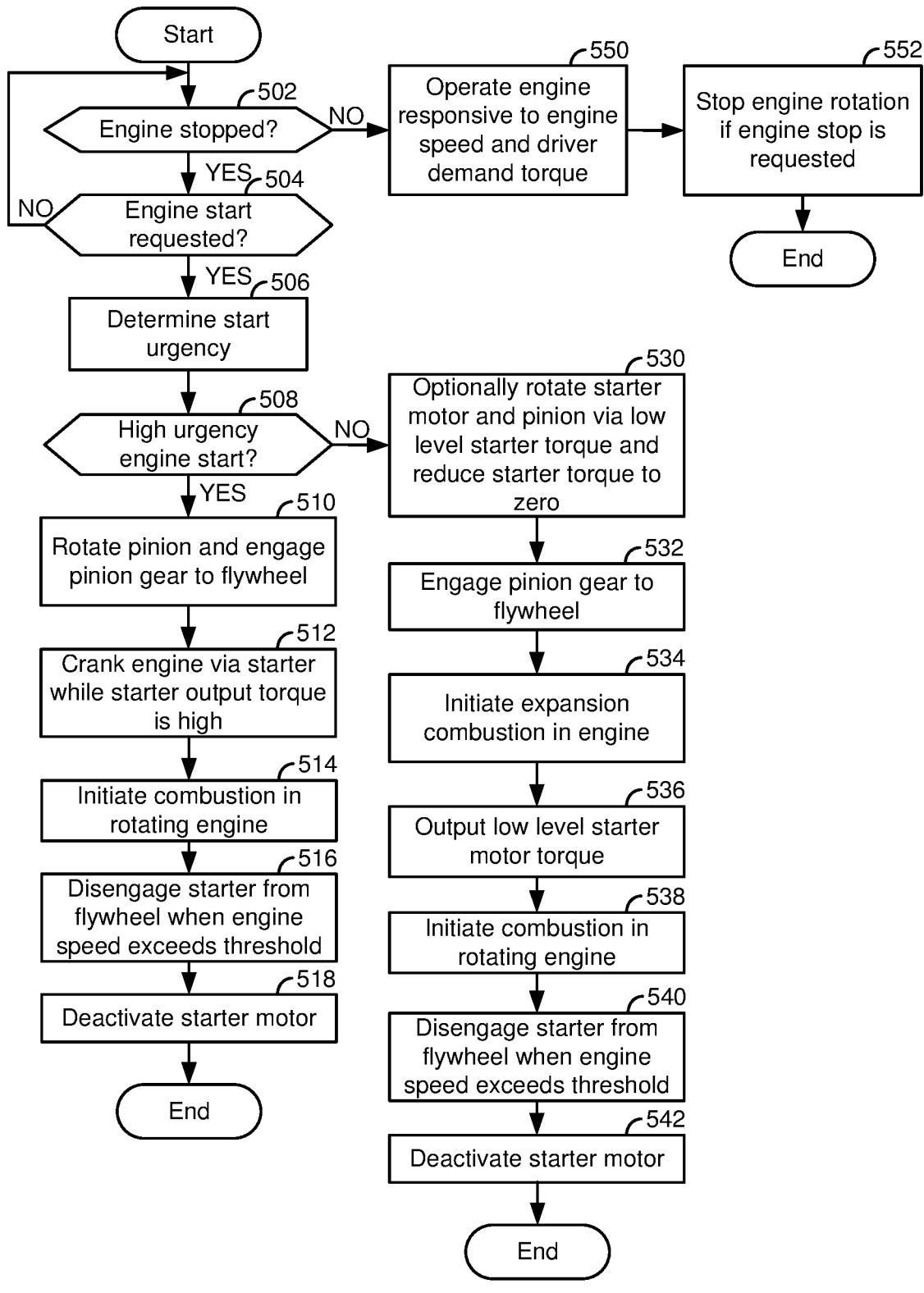
FIG. 5 shows a flowchart of an example method for starting and operating an engine.

Referring now to FIG. 5, a method for starting and operating an internal combustion engine is shown. At least portions of method 500 may be implemented as executable controller instructions stored in non-transitory memory.

Method 500 may operate in cooperation with the system of FIGS. 1-3. Additionally, portions of method 500 may be actions taken in the physical world to transform an operating state of an actuator or device. The method of FIG. 5 may be incorporated into the system of FIGS. 1-3 as executable instructions stored in non-transitory memory.

At 502, method 500 judges if the engine is stopped (e.g., not rotating). Method 500 may judge that the engine is stopped when a pulse train is not output from the engine position sensor. If method 500 judges that the engine is stopped, the answer is yes and method 500 proceeds to 504. Otherwise, the answer is no and method 500 proceeds to 550.

At 550, method 500 operates the engine according to driver demand torque and engine speed. In one example, method 500 determines driver demand torque according to a position of an accelerator pedal. Method 500 commands the engine to provide a percentage of the driver demand torque. Method 500 may also commands the ISG to output a percentage of the driver demand torque. Alternatively, the ISG may be commanded to consume torque from the driveline and charge a battery or other electric energy storage device. Method 500 proceeds to 552.

At 552, method 500 commands the engine to be stopped and not rotate if an engine stop is requested. The engine stop may be requested via a human vehicle occupant. Alternatively, an engine stop may be requested automatically via a controller without input from a human vehicle occupant to a device that has a sole function of starting/stopping the engine (e.g., a human/machine interface). If the engine is not requested to stop, method 500 simply exits.

At 504, method 500 judges if an engine start has been requested. An engine start request may be generated via a human or via a controller or vehicle system. For example, a human may request an engine start via a key switch or a pushbutton. A system or controller may request an automatic engine start via changing a value of a variable in controller memory. The variable in controller memory may take on a particular value if an engine start is requested. If method 500 judges that an engine start is requested, the answer is yes and method 500 proceeds to 506. Otherwise, the answer is no and method 500 returns to 502.

At 506, method 500 determines an urgency level for the requested engine start. In one example, of the originator of a signal that is a basis for the engine start request is a human operator, then the engine start urgency is low urgency. For example, if the engine start request originates from a key switch or pushbutton, the engine start urgency may be determined to be low. Alternatively, if the engine start request originates from a key switch or pushbutton, the engine start urgency may be determined to be high for vehicles having certain powertrain attributes. However, if the engine start request is a result of a driver increasing driver demand torque, the engine start urgency may be determined to be high. If a system component is the originator of the signal that is the basis for the engine start request, then the engine start urgency may be determined to be lower urgency. Further, some vehicle devices that are the basis for the engine start request may be the basis for adjusting engine starting urgency to a high level. For example, an engine exhaust system temperature monitor that is the basis for an engine start request may be deemed to warrant a low engine start urgency level. Conversely, a significant change in battery state of charge in a short time period may be deemed to warrant a high engine start urgency level. Method 500 may adjust engine start urgency levels according to the originator of the engine start request as well as rates of change of vehicle operating parameters (e.g., battery state of charge). Method 500 determines the engine start urgency level and proceeds to 508.

At 508, method 500 judges if the engine start urgency is high. If so, method 500 proceeds to 510. Otherwise, method 500 proceeds to 530.

At 510, method 500 activates the starter motor and advances the starter solenoid so that the pinion gear may engage the flywheel and the ring gear. In one example, the starter motor current is adjusted to a high level so that the starter motor may output a maximum torque so that the engine may be rotated and started quickly. The starter motor current may be adjusted by the controller adjusting a voltage or current that is output to a switch that controls electric current flow to the starter motor. The starter motor may be activated at a same time that the starter solenoid is activated to reduce engine starting time. Method 500 proceeds to 512.

At 512, method 500 cranks (e.g., rotates the engine) the engine via the starter motor while to starter motor is outputting its maximum torque level. Method 500 proceeds to 514.

At 514, method 500 initiates combustion in the engine as the engine rotates under power of the starter motor. Combustion may be initiated by injecting fuel into a cylinder during the cylinder's intake or compression stroke. The fuel is mixed within the cylinder and it may be ignited via a spark that is supplied via a spark plug. If the engine is a port injected engine, the fuel may be injected to a cylinder port while an intake valve of the cylinder is open or while the intake valve of the cylinder is closed. Method 500 may supply spark and fuel to each engine cylinder to initiate combustion in the engine. Method 500 proceeds to 516.

At 516, method 500 disengages the starter pinion gear from the flywheel ring gear when engine speed reaches a threshold speed. The starter pinion gear may be disengaged from the flywheel via retracting the starter solenoid (e.g., deactivating the starter solenoid). The starter solenoid may disengage the pinion gear from the flywheel by ceasing electrical current flow to the starter solenoid. Method 500 proceeds to 518.

At 518, method 500 deactivates the starter motor via ceasing to supply electrical current to the starter motor. Deactivating the starter motor causes the starter motor to cease rotating. In one example, method 500 may cease electrical current flow to the starter motor via adjusting a voltage or a current that is supplied to a switch (e.g., 312). Method 500 proceeds to exit after the starter motor is deactivated.

At 530, method 500 optionally rotates the pinion gear by supplying a small amount of electrical current to the starter motor for a short period of time. For example, an electrical current supplied to the starter motor may be adjusted to a lower level at which the starter motor generates a low amount of torque, the low amount of torque less than the high amount of torque. The small amount of electrical current may be reduced to zero before the starter solenoid engages the pinion gear to the flywheel ring gear during the same engine start. Activating the starter motor in this way may allow the pinion gear to rotate so that when the pinion gear contacts the flywheel and the ring gear, the pinion gear may fully engage the flywheel and ring gear (e.g., the pinion gear may be fully engaged with the flywheel when teeth of the pinion gear are interwoven with teeth of the ring gear). Such a pinion gear engagement is shown in FIG. 4. Method 500 proceeds to 532.

At 532, method 500 engages the pinion gear to the flywheel ring gear. The pinion gear may be engaged to the flywheel ring gear when the starter solenoid plunger or shaft is fully extended. The starter solenoid plunger may be extended via supplying electrical current to the starter solenoid. Method 500 proceeds to 534.

At 534, method 500 initiates expansion combustion in one or more engine cylinders while the engine crankshaft is not rotating. In one example, fuel is directly injected to one or more cylinders that are on their respective expansion or power strokes while the engine is not rotating. Spark is also delivered to the cylinders that are on their expansion strokes after fuel is injected to these same cylinders while the engine is not rotating. The spark may initiate combustion of an air-fuel mixture in the cylinder so that pressure in the cylinders causes the crankshaft to rotate in a forward direction (e.g., a normal rotational direction of the engine). The expansion combustion may reduce an amount of torque to rotate the engine via the starter motor, thereby reducing a load on the starter motor so that the life cycle of the starter motor may be increased. Method 500 proceeds to 536.

At 536, method 500 activates the starter motor. The starter motor may be activated within a predetermined amount of time since spark was delivered to the engine at 534. The starter motor is activated by delivering a lower amount of electrical current to the starter motor as compared to the amount of electrical current that may be supplied to the starter motor at 510. Consequently, the starter motor delivers less torque to rotate the engine than may be delivered at 510. The engine rotates under power of the expansion combustion and the starter motor.

In one example, an amount of time between when spark is delivered to engine cylinders during expansion combustion and a time when the starter motor is activated may be determined as a function of expected engine speed due to expansion combustion, time since spark was delivered for expansion combustion, and measured engine speed. Thus, a delay time between supplying electrical power to the starter motor may be determined according to the following function:

$$\text{Starter\_delay} = f(\text{time\_spark}, \text{eng\_n}, \text{eng\_n\_exp})$$

where starter_delay is an amount of time between when spark is delivered to the engine for expansion combustion, f is a function that returns a starter delay time, time_spark is the amount of time since spark was delivered to the engine for expansion combustion, eng_n is present engine speed, eng_n_exp is expected engine speed due to expansion combustion. Values that are output from function f may be empirically determined via rotating the engine via expansion combustion and activating the starter motor. Method 500 proceeds to 538.

At 538, method 500 initiates normal combustion in the engine as the engine rotates under power of the starter motor and expansion combustion. Normal combustion in a cylinder may be initiated by injecting fuel into the cylinder during the cylinder's intake or compression stroke. The fuel is mixed within the cylinder and it may be ignited via a spark that is supplied via a spark plug. If the engine is a port injected engine, the fuel may be injected to a cylinder port while an intake valve of the cylinder is open or while the intake valve of the cylinder is closed. Method 500 may supply spark and fuel to each engine cylinder to initiate combustion in the engine. Method 500 proceeds to 540.

At 540, method 500 disengages the starter pinion gear from the flywheel ring gear when engine speed reaches a threshold speed. The starter pinion gear may be disengaged from the flywheel via retracting the starter solenoid (e.g., deactivating the starter solenoid). The starter solenoid may disengage the pinion gear from the flywheel by ceasing electrical current flow to the starter solenoid. Method 500 proceeds to 542.

At 542, method 500 deactivates the starter motor via ceasing to supply electrical current to the starter motor. Deactivating the starter motor causes the starter motor to cease rotating. In one example, method 500 may cease electrical current flow to the starter motor via adjusting a voltage or a current that is supplied to a switch (e.g., 312). Method 500 proceeds to exit after the starter motor is deactivated.

In this way, torque capacity of a starter motor may be fully utilized during urgent engine starting conditions to provide a desired level of vehicle responsiveness. However, when engine starting is less urgent, expansion combustion may be initiated before cranking the engine via the starter motor so that a life span of the starter motor may be increased.

The method of FIG. 5 provides for a method for starting an engine, comprising: adjusting a position of a starter solenoid to engage a pinion gear to a flywheel of an engine in response to a request to start the engine; initiating expansion combustion in the engine while the engine is not rotating in response to the request to start the engine; and supplying electrical current to a starter motor after initiating expansion combustion in the engine while the pinion gear is engaged with the flywheel. The method includes where the electrical current is supplied to the starter motor after the pinion gear is engaged with the flywheel. The method further comprises initiating the expansion combustion in the engine in further response to an urgency level of an engine start being low. The method includes where the urgency level of the engine start is based on an origination of the request to start the engine. The method includes where the urgency level of the engine start is determined to be low based on a system of the vehicle requesting the engine start without human operator input. The method includes where the system is a vehicle electrical system. The method includes where supplying current to the starter motor includes supplying a first electric current to the starter motor in response to an urgency level of an engine start being low and supplying a second electric current to the starter motor in response to the urgency level of the engine start being high. The method includes where the first electric current is lower than the second electric current. The method includes where initiating expansion combustion includes injecting fuel to a cylinder that is on an expansion stroke while the engine is not rotating.

The method of FIG. 5 also provides for a method for starting an engine, comprising: adjusting an amount of electrical current delivered to a starter motor in response to a level of urgency of an automatic engine start request. The method further comprises determining the urgency of the automatic engine start request based on the origin of the automatic engine start request. The method includes where adjusting the current includes supplying a first electrical current to the starter motor in response to a low urgency automatic engine start request. The method includes where adjusting the current includes supplying a second electrical current to the starter motor in response to a high urgency automatic engine start request, the second electrical current greater than the first electrical current. The method further comprises supplying an electrical current to a starter solenoid to engage a pinion gear with an engine flywheel before the adjusting of the amount of electrical current delivered to the starter motor in response to the urgency of the automatic engine start request during an engine start.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting an engine, comprising:
adjusting a position of a starter solenoid to engage a pinion gear to a flywheel of an engine while the engine is not rotating in response to a request to start the engine and an urgency level of an engine start;
initiating expansion stroke combustion in the engine while the engine is not rotating in response to the request to start the engine and the urgency level of the engine start; and
supplying electrical current to a starter motor after initiating expansion stroke combustion in the engine while the pinion gear is engaged with the flywheel.

2. The method of claim 1, where the urgency level of the engine start is based on a change in a battery state of charge.

3. The method of claim 1, further comprising initiating the expansion combustion in the engine in further response to an urgency level of an engine start being low.

4. The method of claim 3, where the urgency level of the engine start is based on an originator of the request to start the engine being other than a system component.

5. The method of claim 1, where the urgency level of the engine start is based on the request to start the engine originating from a key switch or a pushbutton, and where the urgency level of the engine start is determined to be low based on the request to start the engine originating from the key switch or the pushbutton.

6. The method of claim 1, where the urgency level of the engine start is based on an increasing driver demand torque.

7. The method of claim 1, where supplying current to the starter motor includes supplying a first electric current to the starter motor in response to a low urgency engine start, and further comprising:
initiating intake or compression stroke combustion in the engine and supplying a second electric current to the starter motor in response to a high urgency engine start.

8. The method of claim 7, where the first electric current is lower than the second electric current.

9. The method of claim 1, where initiating expansion stroke combustion includes injecting fuel to a cylinder that is on an expansion stroke while the engine is not rotating.

* * * * *